UNITED STATES PATENT OFFICE.

JAMES M. POLLARD, OF NEW ORLEANS, LOUISIANA, ASSIGNOR TO GEORGE F. ROBINSON, IN TRUST FOR THE FIRE EXTINGUISHER MANUFACTURING COMPANY, OF NEW YORK, N. Y.

SOLUTION FOR EXTINGUISHING FIRES.

SPECIFICATION forming part of Letters Patent No. 237,902, dated February 15, 1881.

Application filed September 22, 1880. (No specimens.)

*To all whom it may concern:*

Be it known that I, JAMES M. POLLARD, a citizen of the United States, residing at New Orleans, in the parish of Orleans and State of Louisiana, have invented new and useful Improvements in Fire-Extinguishing Solutions, of which the following is a specification.

This invention relates to improved chemical compounds and combinations for generating carbonic-acid gas for producing pressure in the receivers of chemical fire-extinguishers, and retaining the chemicals used for generating carbonic acid in solution with the water to increase the extinguishing power of the latter, and also to avoid clogging the vessels with insoluble residuum.

It is the object of my invention to dispense with the use of free sulphuric acid in the neutralization of sodium bicarbonates, and to effect said neutralization by means of reagents in dry granulated or crystalline form. In using the neutral sulphate of alumina for this purpose, as heretofore, two difficulties have presented themselves, viz: First, the reaction, when unassisted by heat, is too slow when it is necessary to recharge the vessels during the progress of fires; and, second, the sulphate of aluminium—that is, alumina ($Al_2O_3$) after being deprived of its sulphuric acid—forms an insoluble hydrate of alumina, which settles in a gelatinous mass and is very troublesome to remove.

By adding to the sodium bicarbonate a suitable quantity of boracic acid or biborate of sodium in crushed crystalline form it is found that when the aluminium sulphate is neutralized by admixture of sodium bicarbonate the borax, by its affinity for metallic oxides, combines with the oxide of alumina and forms a soluble borate of sodium and alumina, almost entirely preventing the formation of aluminium hydrate. In using in this manner the borax the crushed crystals should bear the proportion of about fifteen per cent., by weight, to one hundred sodium bicarbonate, or the borax may be exsiccated and used in dry powder, mingled with the sodium bicarbonate.

When boracic acid is used it may be mingled with either the alumina or soda, in which case there should be used a slight excess of soda, with which it unites to form borax or the borate of sodium and aluminium, increasing the solubility of all the chemicals used.

I have also added to the foregoing the acid sulphate of sodium ($NaHSO_4$;) or, as sometimes expressed, ($Na_2SO_4H_2SO_4$.) This salt is a bisulphate of sodium, containing one equivalent of sulphuric acid in excess; and, owing to its great solubility and the instant reaction when mixed with sodium bicarbonate, it can be used with very great advantage mingled with the aluminium sulphate. This may be done in any proportions; but I prefer to use one-half sulphate of alumina and one-half bisulphate of sodium, and thus the quantity of oxide of alumina and resulting hydrate are of course reduced one-half, and the solubility of the salts very greatly increased. Where extremely rapid action of the chemicals is desired the quantity of bisulphate of sodium is increased, and for some purposes it is better with no admixture of the aluminium sulphate.

When aluminium sulphate and sodium bisulphate are used together the sodium bicarbonate and biborate are mingled together. The tendency of the bisulphate of sodium to absorb moisture from the air and separate into a neutral sulphate and free sulphuric acid is remedied by the admixture of an equal portion of aluminium sulphate, the latter salt being dry and porous, and absorbing the excess of acid in the sodium bisulphate.

The proportions of the chemicals used in charging a receiver are ordinarily about as follows, the capacity of the receiver being, say, two hundred and fifty gallons: Bicarbonate of soda, seventy-five pounds; borax, twenty-five pounds, mixed; sulphate of aluminium, fifty pounds; bisulphate of sodium, fifty pounds, mixed. The mixed soda bicarbonate and borax form one reagent, and the mixed aluminium sulphate and bisulphate of sodium the other. These two reagents may be arranged in the receiver, and water sufficient to fill the same introduced in any ordinary or suitable manner.

As is well known, chemical fire-extinguishing engines become more effective as the solution thrown thereby becomes more heavily charged with chemicals, and any increase of the body of chemicals in solution is thus an improvement. The action of fire upon the improved solution which I have described is, first, to evaporate the water of solution; next, to expel the water of crystallization and combination, and then convert the sulphur to sulphurous-acid gas, which is a very powerful extinguisher of fire. The surface of everything touched by the solution is found, after the action of fire thereupon, to be covered by the oxides of aluminium and sodium, and almost fire-proof.

Having now fully described my invention, what I claim is—

A fire-extinguishing solution consisting of aluminium sulphate, sodium bicarbonate, borax, and sodium bisulphate, with a suitable quantity of water, combined substantially in the proportions specified.

In testimony whereof I have hereunto set my hand and seal in the presence of two subscribing witnesses.

J. M. POLLARD. [L. S.]

Witnesses:
JAMES L. NORRIS,
J. HERMANN WAHLERS.